Patent 2,716,559

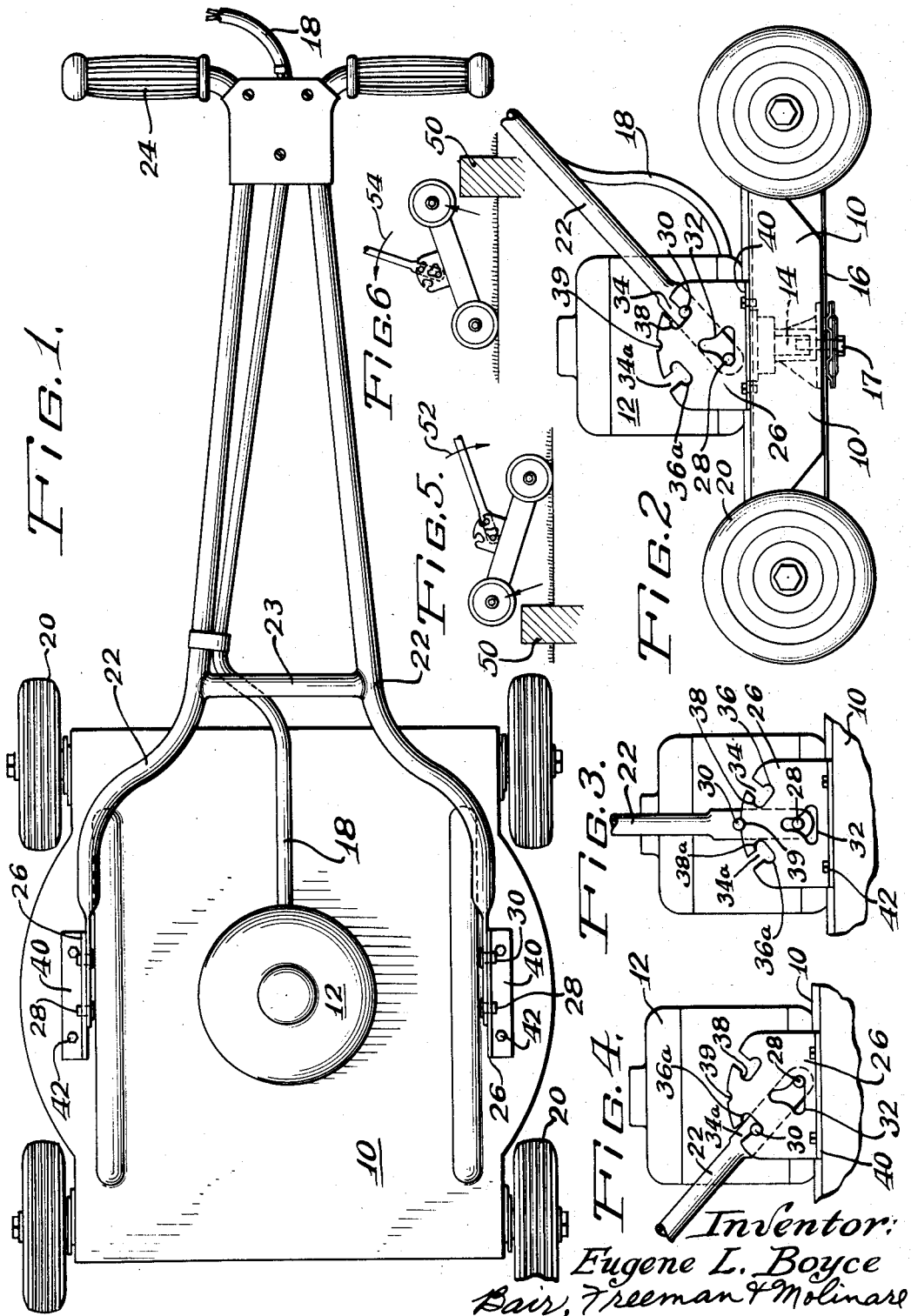

2,716,559

REVERSIBLE HANDLE FOR LAWN MOWERS AND THE LIKE

Eugene L. Boyce, Lincoln, Miss., assignor to Johnston Lawn Mower Corporation, Brookhaven, Miss., a corporation of Iowa Application January 19, 1953, Serial No. 332,050

3 Claims. (Cl. 280—47.36)

This invention relates to a handle particularly designed for mowers and the like, the handle being capable of reversal in relation to the mower so that the mower may be pushed from either end thereof. A reversible handle is particularly desirable in connection with an electrically driven mower wherein a cord for supplying electric current to the motor extends from the motor and along the handle of the mower and then from the handle to an electric outlet. When using this type of mower, it is desirable to have a reversible handle so that the mower can be pushed in one direction, the handle reversed and the mower then pushed in the other direction instead of turning it around at the end of a row which tends to twist the supply cord.

One object of my invention is to provide a handle that may be readily reversed.

Another object is to provide a handle that has limited floating movement, yet is capable of floating without becoming disassociated from a desirable relationship to the mower frame.

Still another object is to provide the floating of the handle limited when moved in either position so that either the front end or the rear end of the mower may be lifted for clearing curbs and the like.

A further object is to provide a bracket and handle combination wherein the bracket is provided with an opening and notch arrangement coacting with projections of the handle to permit some floating movement normally and to also permit a partial disassociation of the handle relative to the bracket for reversing the handle.

Still a further object is to provide an opening and double notch arrangement that permits reversing of the handle.

An additional object is to provide a third notch in the bracket permitting "parking" of the handle in a vertical position as when storing the mower.

With these and other objects in view, my invention consists in the construction, arrangement and combination of the various parts of my reversible handle for mowers and the like, whereby the objects contemplated are attained, as hereinafter more fully set forth, pointed out in my claims and illustrated in the accompanying drawings, wherein:

Figure 1 is a plan view of a mower with my reversible handle structure applied thereto.

Figure 2 is a side elevation of Figure 1 showing the handle in one position.

Figure 3 is a similar view of a portion of Figure 2 showing the handle in a vertical or "parked" position.

Figure 4 is a similar view showing it in the reversed position; and

Figures 5 and 6 are views similar to Figure 2 but more diagrammatic to show the lifting of either the front end or the rear end of the mower over a curb or the like.

On the accompanying drawing I have used the reference numeral 10 to indicate a mower frame. An electric motor 12 is mounted thereon with its shaft 14 vertical, and a cutter bar 16 is secured to the shaft as by a bolt 17, the arrangement being such that rotation of the shaft 14 rotates the blade 16 for the cutting of grass and weeds, etc. in the usual manner. An electric supply cord 18 extends from the motor 12, along a handle 22 and therefrom to a suitable service outlet (not shown).

The platform 10 is supported for mobility as by means of four wheels 20. The handle 22 provided therefor is in the form of a yoke with a crosspiece 23 and at the outer ends of the handle are hand grips 24 for grasping the handle and propelling the mower thereby.

Each fork of the handle 22 is provided with a pair of projections 28 and 30 to cooperate with a bracket 26, there being two of the brackets as illustrated in Figure 1. The brackets 26 are provided with flanges 40 which permit them to be secured to the platform 10 as by bolts 42. Each bracket 26 has a triangular-shaped opening 32 adjacent its center and a notch at one side indicated at 34 having enlarged seats therein at 36 and 38. The notch and seat arrangement is substantially T-shaped as illustrated in Figure 3 for instance.

The other side of the bracket 26 has a similar notch and seat arrangement 34a–36a–38a while the top of the bracket has a shallow notch 39 therein. The triangular opening 32 and the notches 34 and 34a are shaped as disclosed on the drawings for a purpose which will now be described. Figure 2 shows the normal position of the handle 22 for propelling the mower in one direction (toward the left). The projection 28 is in the lower left corner of the triangular opening 32 and the projection 30 is seated in the seat 36. The handle is thus limited by the seat but nevertheless has some floating movement between this seat and the upper seat 38. This makes it convenient to propel the mower across the lawn without having to keep the handle in a predetermined position relative to the mower frame.

When, however, as in Figure 5, it is desirable to elevate the front of the mower over a curb such as shown at 50, the handle 22 may be depressed as indicated by the arrow 52 for this purpose. On the other hand, when it is desirable to have the rear wheels clear the curb 50 as in Figure 6, the handle may be lifted up as indicated by the arrow 54, and the projections 30 will then seat in the seats 38.

When it is desirable to "park" the handle 22 in the vertical position, this may be done by pulling the projections 30 out of the slots 34 and then swinging the handle up to seat the projections 30 in the shallow notches 39 as shown in Figure 3. This is convenient when storing the mower in a garage or basement.

It is desirable to have the handle 22 reversible on an electric mower rather than having it non-reversible and then requiring that the mower be turned around at each end of a row. By having the handle reversible, the cord 18 is not nearly so likely to become twisted and tangled when reversing the handle as it would be when reversing the entire mower. Therefore, I provide a second set of notches 34a with seats 36a and 38a so that the projection 30 of the handle can be associated with them as in Figure 4 when propelling the mower back in the opposite direction. The triangular shape of the openings 32 permit this adjustment and also the adjustment to the vertical position of Figure 3 in an obvious manner.

The desirability of reversibility of the handle is believed obvious from the foregoing specification, yet a floating handle is permitted and at the same time it is limited in its floating movements so that either the front or rear end of the mower may be lifted over a curb as in Figures 5 and 6 by proper manipulation of the handle. Thus in addition to the convenience of reversibility for an electrically driven mower, I provide for floating of the handle, limited in its movement, however, to permit the handle to serve as a lever for properly elevating either end of the mower when passing over obstructions such as curbs and the like.

Some changes may be made in the construction and arrangement of the parts of my reversible handle for mowers and the like without departing from the real spirit and purpose of my invention, and it is my intention to cover by my claims any modified forms of structure or use of mechanical equivalents which may be reasonably included within their scope.

I claim as my invention:

1. In a reversible handle, a handle member and a bracket for mounting said handle member, said bracket having an opening and a pair of notches one for the handle member projecting in one direction and the other for the handle member projecting in an opposite direction, said handle member having a projection in said opening and a projection to enter either of said notches selectively, each of said notches having an entrance portion and a pair of opposite seat portions, said entrance portions being located between opposite seat portions and said opening being substantially triangular in shape with provisions at each corner of the triangle for said first projection to seat in, whereby the other projection may be shifted from one seat portion to the other of either of said notches, or may be drawn out of one notch to permit entrance to the other notch.

2. In a device of the class described for mowers and the like, a handle and a plate-like bracket for mounting said handle on the mower, said bracket having a central opening of inverted T shape and a pair of notches in opposite side edges thereof, said handle having a projection in said opening and a projection to enter either of said notches selectively, each of said notches having an entrance portion and a pair of opposite seat portions inwardly thereof, said entrance portions being located between said opposite seat portions and said opening having provision at opposite ends of its cross portion for said first projection to seat in whereby the second projection may be shifted from one seat portion to the other of either of said notches and said handle used in either position of said second projection as a lever to tilt said bracket and thereby said mower.

3. In a device of the class described for mowers and the like, a handle and a plate-like bracket for mounting said handle on the mower, said bracket having a central opening of inverted T shape and a pair of notches in opposite side edges thereof, said handle having a projection in said opening and a projection to enter either of said notches selectively, each of said notches having an entrance portion and a pair of opposite seat portions inwardly thereof, said entrance portions being located between said opposite seat portions and said opening having provision at opposite ends of its cross portion for said first projection to seat in whereby the second projection may be shifted from one seat portion to the other of either of said notches and said handle used in either position of said second projection as a lever to tilt said bracket and thereby said mower or may be drawn out of one notch to permit additional swinging of said lever relative to said bracket to enter the other notch, said bracket having intermediate said notches a third notch to receive said other projection in a substantially vertical position of said handle.

References Cited in the file of this patent

UNITED STATES PATENTS

| 843,770 | RuTon | Feb. 12, 1907 |
| 952,051 | Sowash et al. | Mar. 15, 1910 |

FOREIGN PATENTS

| 169,326 | Great Britain | Sept. 29, 1921 |